United States Patent
Almog et al.

(10) Patent No.: US 10,516,562 B2
(45) Date of Patent: Dec. 24, 2019

(54) COMMUNICATION DEVICE AND METHOD FOR PERFORMING RADIO COMMUNICATION

(71) Applicant: Intel IP Corporation, Santa Clara, CA (US)

(72) Inventors: Itay Almog, Ganey Tikva (IL); Michael Kerner, Tel Mond (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/775,845

(22) PCT Filed: Dec. 21, 2015

(86) PCT No.: PCT/US2015/066969
§ 371 (c)(1),
(2) Date: May 14, 2018

(87) PCT Pub. No.: WO2017/111882
PCT Pub. Date: Jun. 29, 2017

(65) Prior Publication Data
US 2018/0331878 A1 Nov. 15, 2018

(51) Int. Cl.
*H04L 27/34* (2006.01)
*H04L 1/00* (2006.01)
(Continued)

(52) U.S. Cl.
CPC ............ *H04L 27/3411* (2013.01); *H04L 1/00* (2013.01); *H04L 1/0084* (2013.01); *H04L 25/02* (2013.01);
(Continued)

(58) Field of Classification Search
CPC ..... H04L 27/3411; H04L 1/00; H04L 1/0084; H04L 25/02; H04L 27/2623; H04L 27/2627; H04L 27/366
See application file for complete search history.

(56) References Cited

U.S. PATENT DOCUMENTS

| 2003/0202460 A1* | 10/2003 | Jung | ................... H04L 27/2621 370/208 |
| 2007/0116142 A1* | 5/2007 | Molander | ........... H04L 27/2624 375/260 |

(Continued)

OTHER PUBLICATIONS

International Search Report based on application No. PCT/US2015/066969 (13 pages) dated Aug. 24, 2016 (Reference Purpose Only).
(Continued)

*Primary Examiner* — Freshteh N Aghdam
(74) *Attorney, Agent, or Firm* — Viering, Jentschura & Partner mbB

(57) ABSTRACT

A communication device is provided that includes a modulation circuit configured to modulate a signal comprising a first signal portion of a first data type and a second signal portion of a second data type. The modulation circuit is configured to modulate the first signal portion in accordance with a first modulation scheme and the second signal portion in accordance with a second modulation scheme. At least one of the first data type is different from the second data type or the second modulation scheme is different from the first modulation scheme. The communication device further includes a modification circuit configured to modify the modulated first signal portion based on a first modification scheme and the second signal portion based on a second modification scheme. The communication device further includes a transmitter configured to transmit the modified first signal portion and the modified second signal portion.

25 Claims, 7 Drawing Sheets

(51) Int. Cl.
   *H04L 25/02*   (2006.01)
   *H04L 27/36*   (2006.01)
   *H04L 27/26*   (2006.01)
   *H04L 27/00*   (2006.01)

(52) U.S. Cl.
   CPC ...... *H04L 27/0008* (2013.01); *H04L 27/2623* (2013.01); *H04L 27/2627* (2013.01); *H04L 27/366* (2013.01)

(56) References Cited

U.S. PATENT DOCUMENTS

| | | |
|---|---|---|
| 2011/0216814 A1 | 9/2011 | Browning et al. |
| 2012/0039198 A1 | 2/2012 | Yang et al. |
| 2012/0044892 A1 | 2/2012 | Guan et al. |
| 2012/0114074 A1* | 5/2012 | Moffatt ............... H04L 27/2614 375/296 |
| 2012/0257665 A1 | 10/2012 | Honda |
| 2013/0259017 A1 | 10/2013 | Zhang et al. |
| 2015/0201296 A1* | 7/2015 | Oh .......................... H04W 4/70 375/308 |
| 2015/0326338 A1* | 11/2015 | Zhou ................... H04B 10/116 398/98 |
| 2017/0257250 A1* | 9/2017 | He .......................... H04L 27/32 |
| 2018/0084398 A1* | 3/2018 | Xiong .................. H04W 8/005 |

OTHER PUBLICATIONS

The extended European search report issued in the corresponding Patent Application No. 15911578.1, 9 pages, dated Jun. 26, 2019.

\* cited by examiner

702 — Modulating a signal including signal portions of a plurality of signal portions. Each signal portion of the plurality of signal portions may have a data type of a plurality of data types and may be modulated in accordance with a modulation scheme of a plurality of modulation schemes. At least one of a first data type of a first signal portion of each pair of signal portions of the plurality of signal portions may be different from a second data type of a second signal portion of the each pair of signal portions or a first modulation scheme of the first signal portion of the each pair of signal portions may be different from a second modulation scheme of the second signal portion of the each pair of signal portions.

704 — Modifying the modulated signal portions of the plurality of signal portions based on modification schemes of a plurality of predefined modification schemes, respectively.

706 — Transmitting the modified signal portions of the plurality of signal portions.

COMMUNICATION DEVICE AND METHOD FOR PERFORMING RADIO COMMUNICATION

CROSS-REFERENCE TO RELATED APPLICATION

The present application is a national stage entry according to 35 U.S.C. § 371 of PCT application No.: PCT/US2015/066969 filed on Dec. 21, 2015, and is incorporated herein by reference in its entirety and for all purposes.

TECHNICAL FIELD

The present disclosure relates to communication devices and methods for signal determination in radio communication.

BACKGROUND

In a scenario, a wireless device may transmit a signal according to a radio communication standard. The signal may have a maximum power in order to comply with regulations of the radio communication standard. It may be desirable to provide a communication device that may have a high maximum transmission power.

SUMMARY

A communication device is provided that includes a modulation circuit configured to modulate a signal including a first signal portion of a first data type and a second signal portion of a second data type. The modulation circuit is configured to modulate the first signal portion in accordance with a first modulation scheme and the second signal portion in accordance with a second modulation scheme. At least one of the first data type is different from the second data type or the second modulation scheme is different from the first modulation scheme. The communication device further includes a modification circuit configured to modify the modulated first signal portion based on a first modification scheme and the second signal portion based on a second modification scheme. The communication device further includes a transmitter configured to transmit the modified first signal portion and the modified second signal portion.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 7 shows a second method for performing radio communication.

DESCRIPTION

Figure 1:
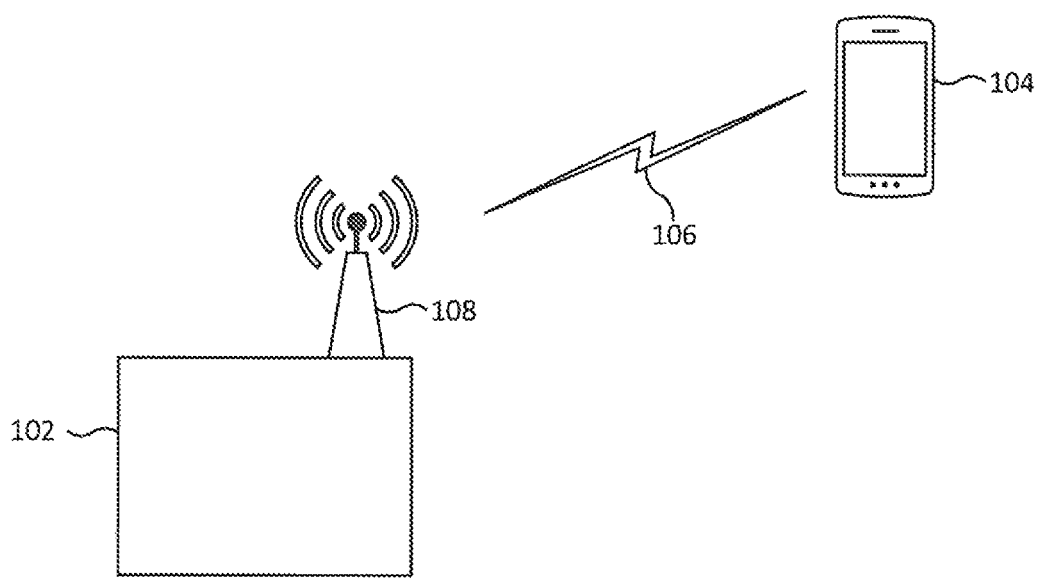
FIG. 1 shows a schematic drawing of a Wi-Fi access point and a Wi-Fi device that may be connected with the Wi-Fi access point via a radio frequency connection.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

A wide range of mobile communication systems may be configured to modulate signals in accordance with an Orthogonal Frequency Division Multiplexing (OFDM) modulation scheme and to transform signals in accordance with an Inverse Fast Fourier Transform (IFFT). A power of a signal that may be transformed in accordance with IFFT may have high peaks due to constructive behavior of the IFFT and may have zero average power in portions of the transformed signal that are affected by destructive behavior of the IFFT. Further, the transformed signal may be fed to an amplifier. An approach to reduce a crest factor of the transformed signal may be to clip and filter the signal before amplification. Clipping may reduce the crest factor on the cost of in-band noise distortion and out-of-band noise regrowth. Filtering after clipping may reduce only the spectral splatter. Clipping levels may be adjusted to the modulation and coding scheme, because Error Vector Magnitude requirements may be different for each of the modulation and coding schemes. Moreover, spectral splatter may have an asymmetric shape even without introducing any memory effect from the power amplifier so that the mobile communication system may not pass at least one of a 160 MHz spectral mask regulation test, an 80 MHz spectral mask regulation test or a 40 MHz spectral mask regulation test. Further, a signal in accordance with a 802.11ac radio communication standard may have a Legacy Signal field (L-SIG) portion and a Very High Throughput Signal-A (VHT-SIG-A) portion. The L-SIG portion and the VHT-SIG-A portion may be defined as eight duplications of a bandwidth symbol that each may be shifted by 20 MHz. Some inter-modulations may cancel with other inter-modulations so that an amplified signal may have an asymmetric amplitude with respect to the frequency of the signal and the bandwidth frequency as center frequency. Further, the amplified signal may have an increased peak-to-average power ratio in the duplicated portions.

Moreover, a communication device may be configured to clip a power ratio of a signal in at least two portions of the signal at different maximum power ratios, respectively. The portions of the signal may have different signal properties and the communication device may be configured to adjust the clipping of the portions according to the different properties such that the signal may be amplified to a higher average power and still complies with maximum power regulations. Further, the peak-to-average power ratio of the amplified signal may be reduced so that the spectral splatter of the signal may be reduced. Moreover, the communication device may be configured to amplify the signal to a higher power without violation of the Error Vector Magnitude requirements of the signal portions, respectively.

Various aspects of this disclosure provide a communication device that may include a modulation circuit configured to modulate a signal. The signal may include a first signal portion of a first data type and a second signal portion of a second data type. Further, the modulation circuit may be configured to modulate the first signal portion in accordance with a first modulation scheme and the second signal portion in accordance with a second modulation scheme. At least one of the first data type may be different from the second data type or the second modulation scheme may be different from the first modulation scheme. Further, the communication device may include a modification circuit configured to modify the modulated first signal portion based on a first modification scheme and the second signal portion based on a second modification scheme. Moreover, the communication device may include a transmitter configured to transmit the modified first signal portion and the modified second signal portion. Thus, the communication device may be configured to transmit a high power signal that is consistent with restrictions of communication standards. Further, the signal may have low spectral splatter and have a small Error Vector Magnitude (EVM). Moreover, the first modulation scheme may be the second modulation scheme and the first data type may be different from the second data type. Further, the first modulation scheme may be different from the second modulation scheme and the first data type may be the second data type. Moreover, the first modulation scheme may be different from the second modulation scheme and the first data type may be different from the second data type. Further, the communication standards may require different maximum Error Vector Magnitudes of signal portions that include signals with data types that are different from each other so that the modification schemes may be adjusted to the Error Vector Magnitude requirements of the signal portions.

In an example, the modification circuit may be configured to modify the modulated first signal portion such that the peak-to-average power ratio of the modified first signal portion is smaller or equal than a first threshold peak-to-average power ratio. Further, the modification circuit may be configured to modify the modulated second signal portion such that the peak-to-average power ratio of the modified second signal portion is smaller or equal than a second threshold peak-to-average power ratio that is different from the first threshold peak-to-average power ratio. Thus, the communication device may be configured to transmit a high power signal in accordance with regulations and restrictions. Further, the peak-to-average power ratio may be a ratio of a peak power of the signal to an average power of the signal. In other words, the peak-to-average power ratio may be the square of the Crest factor.

In an example, the modification circuit may be configured to determine a first clipped signal by clipping the modulated first signal portion at the first threshold peak-to-average power ratio. Further, the modification circuit may be configured to determine a second clipped signal by clipping the modulated second signal portion at the second threshold peak-to-average power ratio. The modified signal may include the first clipped signal and the second clipped signal. Thus, the communication device may be configured to modify the signal in a simple and effective manner such that the signal may comply with regulation restrictions. Moreover, a spectral splatter of the modified signal may be reduced without significant increase of the Error Vector Magnitude of the modified signal. Further, the communication device may be configured to clip the modulated signal portions such that the peak-to-average power ratios of the signal portions do not exceed the threshold peak-to-average power ratios, respectively.

In an example, the modified signal may include the first clipped signal in a first time portion of the modified signal and the second clipped signal in a second time portion of the modified signal. Further, the transmitter may be configured to transmit the modified signal.

In an example, the modification circuit may be configured to determine the first threshold peak-to-average power ratio based on at least one of the first modulation scheme, a data rate of the first signal portion or a data type of the first signal portion. Further, the modification circuit may be configured to determine the second threshold peak-to-average power ratio based on at least one of the second modulation scheme, a data rate of the second signal portion or a data type of the second signal portion. Thus, the modification circuit may be configured to determine effective threshold peak-to-average power ratios in a flexible manner.

In an example, the data type may be a data type of a group of data types consisting of preamble, header and message content data. Thus, the modification circuit may be configured to determine the threshold peak-to-average power ratios in a flexible manner. The preamble may be at least one of a Short Training Field (STF) or a Long Training Field (LTF) that may be in accordance with the 802.11ac radio communication standard. The STF and the LTF may be any type. For example, the STF and the LTF may be at least one of the types Legacy, High Throughput (HT) or Very High Throughput (VHT). Further, the header may be a Signal Field (SIG) in accordance with the 802.11ac radio communication standard of any type. For example, the SIG may be at least one of the types Legacy, High Throughput (HT) or Very High Throughput (VHT).

In an example, the first modulation scheme and the second modulation scheme may be modulation schemes of a group of modulation schemes consisting of Binary Phase-Shift Keying, Quadrature Phase-Shift Keying, Sixteen Quadrature Amplitude Modulation, Sixty Four Quadrature Amplitude Modulation, Two Hundred Fifty Six Quadrature Amplitude Modulation and One Thousand Twenty Four Quadrature Amplitude Modulation. Thus, the communication device may be flexible.

In an example, the first modulation scheme and the second modulation scheme may be coded in accordance with a code rate of one of a group of code rates consisting of one half, two thirds, three quarters, five sixths and seven eighths. Thus, the communication device may be flexible.

In an example, the communication device may further include a control circuit configured to receive a first information signal that includes a first information based on the first signal portion and a second information signal that includes a second information based on the second signal portion. Further, the control circuit may be configured to select a predefined first value of a plurality of predefined values based on the first information and a predefined second value of a plurality of predefined values based on the second information. Moreover, the modification circuit may be configured to determine the first threshold peak-to-average power ratio to be the first value and the second threshold peak-to-average power ratio to be the second value. Thus, the modification circuit may be configured to determine the threshold peak-to-average power ratios in a reliable manner.

In an example, the first information may include at least one of a first modulation scheme information of the first modulation scheme, a first data rate information of the data rate of the first signal portion or a first data type information of the data type of the first signal portion. Further, the second information may include at least one of a second modulation scheme information of the second modulation scheme, a second data rate information of the data rate of the second signal portion or a second data type information of the data type of the second signal portion. Thus, the control circuit may be configured to select peak-to-average threshold values in a flexible manner.

In an example, the control circuit may be configured to select the first threshold peak-to-average power ratio based on at least one of the first modulation scheme information, the first data rate information or the first data type information. Further, the control circuit may be configured to select the second threshold peak-to-average power ratio based on at least one of the second modulation scheme information, the second data rate information or the second data type information. Thus, the control circuit may be configured to select the threshold peak-to-average power ratios in a reliable manner.

In an example, the first signal portion may include a first data packet and the second signal portion may include a second data packet. Further, the data type of the first signal portion may be the data type of the first data packet. Moreover, the data type of the second signal portion may be the data type of the second data packet.

Various aspects of this disclosure provide a communication device that may include a modulation circuit configured to modulate a signal including signal portions of a plurality of signal portions. Each signal portion of the plurality of signal portions may have a data type of a plurality of data types and may be modulated in accordance with a modulation scheme of a plurality of modulation schemes. At least one of a first data type of a first signal portion of each pair of signal portions of the plurality of signal portions may be different from a second data type of a second signal portion of the each pair of signal portions or a first modulation scheme of the first signal portion of the each pair of signal portions may be different from a second modulation scheme of the second signal portion of the each pair of signal portions. Further, the communication device may include a modification circuit configured to modify the modulated signal portions of the plurality of signal portions based on modification schemes of a plurality of predefined modification schemes, respectively. Moreover, the communication device may include a transmitter configured to transmit the modified signal portions of the plurality of signal portions. Thus, the communication device may be configured to transmit a high power signal that complies with restrictions in accordance with communication standards. Further, the signal may have low spectral splatter and the Error Vector Magnitude (EVM) may be small. Moreover, the first modulation scheme of the each pair of signal portions may be the second modulation scheme and the first data type of the each pair of signal portions may be different from the second data type. Further, the first modulation scheme of the each pair of signal portions may be different from the second modulation scheme and the first data type of the each pair of signal portions may be the second data type. Moreover, the first modulation scheme of the each pair of signal portions may be different from the second modulation scheme and the first data type of the each pair of signal portions may be different from the second data type.

In an example, the modification circuit may be configured to modify the modulated signal portions of the plurality of signal portions such that the peak-to-average power ratios of the modified signal portions of the plurality of signal portions are smaller or equal than threshold peak-to-average power ratios of a plurality of threshold peak-to-average power ratios, respectively. Thus, the communication device may be configured to transmit signals with a high peak-to-average power in accordance with regulations and restrictions.

In an example, the modification circuit may be configured to determine a plurality of clipped signals by clipping the modulated signal portions of the plurality of signal portions at the threshold peak-to-average power ratios of the plurality of threshold peak-to-average power ratios, respectively. The modified signal may include the plurality of clipped signals. Thus, a high power signal may be modified in a simple and effective manner such that the signal may comply with regulation restrictions.

In an example, the modified signal may include a plurality of time portions that include the clipped signals of the plurality of clipped signals, respectively. Further, the transmitter may be configured to transmit the modified signal.

In an example, the modification circuit may be configured to determine the threshold peak-to-average power ratios of the plurality of threshold peak-to-average power ratios based on at least one of the modulation schemes of the plurality of modulation schemes, data rates of the signal portions of the plurality of signal portions or the data types of the signal portions of the plurality of signal portions. Thus, the modification circuit may be configured to determine effective threshold peak-to-average power ratios in a flexible manner.

In an example, each modulation scheme of the plurality of modulation schemes may be coded in accordance with a code rate of one of a group of code rates consisting of one half, two thirds, three quarters, five sixths and seven eighths. Thus, the communication device may be flexible.

In an example, the communication device may further include a control circuit configured to receive a plurality of information signals associated with the signal portions, respectively. Each information signal of the plurality of information signals may include an information data based on the signal portion that the each information signal is associated with. Moreover, the control circuit may be configured to select predefined values of a plurality of predefined values based on the information data of the information signals of the plurality of information signals. Further, the modification circuit may be configured to determine the threshold peak-to-average power ratios of the plurality of threshold peak-to-average power ratios to be the selected predefined values, respectively. Thus, the modification circuit may be configured to determine threshold peak-to-average power ratios in a reliable manner.

In an example, the information data of each information signal may include at least one of a modulation scheme information of the signal portion that the information signal is associated with, a data rate information of the signal portion that the information signal is associated with or a data type information of the signal portion that the information signal is associated with. Thus, the control circuit may be configured to select peak-to-average threshold values in a flexible manner.

In an example, the control circuit may be configured to select each predefined value of the plurality of predefined values based on at least one of the modulation scheme information of the signal portion that the information signal is associated with, the data rate information of the signal portion that the information signal is associated with or the data type information of the first signal portion that the information signal is associated with. Thus, the control circuit may be configured to select the threshold peak-to-average power ratios in a reliable manner.

In an example, the signal portions of the plurality of signal portions may include data packets of a plurality of data packets, respectively. The data types of the signal portions of the plurality of signal portions may be data types of the data packets of the plurality of data packets, respectively.

In an example, the transmitter may include a finite-impulse-response filter configured to filter the modified signal portions. Thus, the filtered signal portions may comply with regulations without a necessity to adapt the receiver.

In an example, the transmitter may include a digital-to-analog-converter configured to determine analog signal portions based on the filtered signal portions, respectively.

In an example, the transmitter may include a power amplifier configured to amplify the power of the converted signal portions. Thus, the communication device may be configured to transmit high power signals that comply with regulations.

In an example, the modulation circuit may include a transformation circuit configured to transform the signal based on an inverse fast Fourier transformation.

In an example, the communication device may be configured in accordance with a communication standard of a group of communication standards consisting of Wi-Fi, Universal Mobile Telecommunications System, Enhanced Data Rates for Global Evolution, Code Division Multiple Access 200, Long Term Evolution, Long Term Evolution Advanced and Blue Tooth. Thus, the communication device may be flexible.

Furthermore, a method for performing radio communication may be provided that includes modulating a signal including a first signal portion of a first data type and a second signal portion of a second data type. The first signal portion may be modulated in accordance with a first modulation scheme and the second signal portion may be modulated in accordance with a second modulation scheme. At least one of the first data type may be different from the second data type or the second modulation scheme may be different from the first modulation scheme. Further, the method may include modifying the modulated first signal portion based on a first modification scheme and the second signal portion based on a second modification scheme. Moreover, the method may include transmitting the modified first signal portion and the modified second signal portion. Thus, the communication device may be configured to transmit a high power signal that is consistent with restrictions according to communication standards. Further, the signal may have a low spectral splatter and the Error Vector Magnitude (EVM) of the signal may be small. Moreover, the first modulation scheme may be the second modulation scheme and the first data type may be different from the second data type. Further, the first modulation scheme may be different from the second modulation scheme and the first data type may be the second data type. Moreover, the first modulation scheme may be different from the second modulation scheme and the first data type may be different from the second data type.

Furthermore, a method for performing radio communication may be provided that may include modulating a signal including signal portions of a plurality of signal portions. Each signal portion of the plurality of signal portions may have a data type of a plurality of data types and may be modulated in accordance with a modulation scheme of a plurality of modulation schemes. At least one of a first data type of a first signal portion of each pair of signal portions of the plurality of signal portions may be different from a second data type of a second signal portion of the each pair of signal portions or a first modulation scheme of the first signal portion of the each pair of signal portions may be different from a second modulation scheme of the second signal portion of the each pair of signal portions. Further, the method may include modifying the modulated signal portions of the plurality of signal portions based on modification schemes of a plurality of predefined modification schemes, respectively. Moreover, the method may include transmitting the modified signal portions of the plurality of signal portions. Thus, the communication device may be configured to transmit a high power signal that is consistent with restrictions according to communication standards. Further, the signal may have low spectral splatter and the Error Vector Magnitude (EVM) may be small.

FIG. 1 shows a schematic drawing of a Wi-Fi access point 102 and a Wi-Fi device 104 that may be connected with the Wi-Fi access point 102 via a radio frequency connection 106. The Wi-Fi access point 102 may be configured to transmit a signal in accordance with the Wi-Fi 802.11ac communication standard via a transceiver 108 of the Wi-Fi access point 102 to the Wi-Fi device 104.

Figure 2:
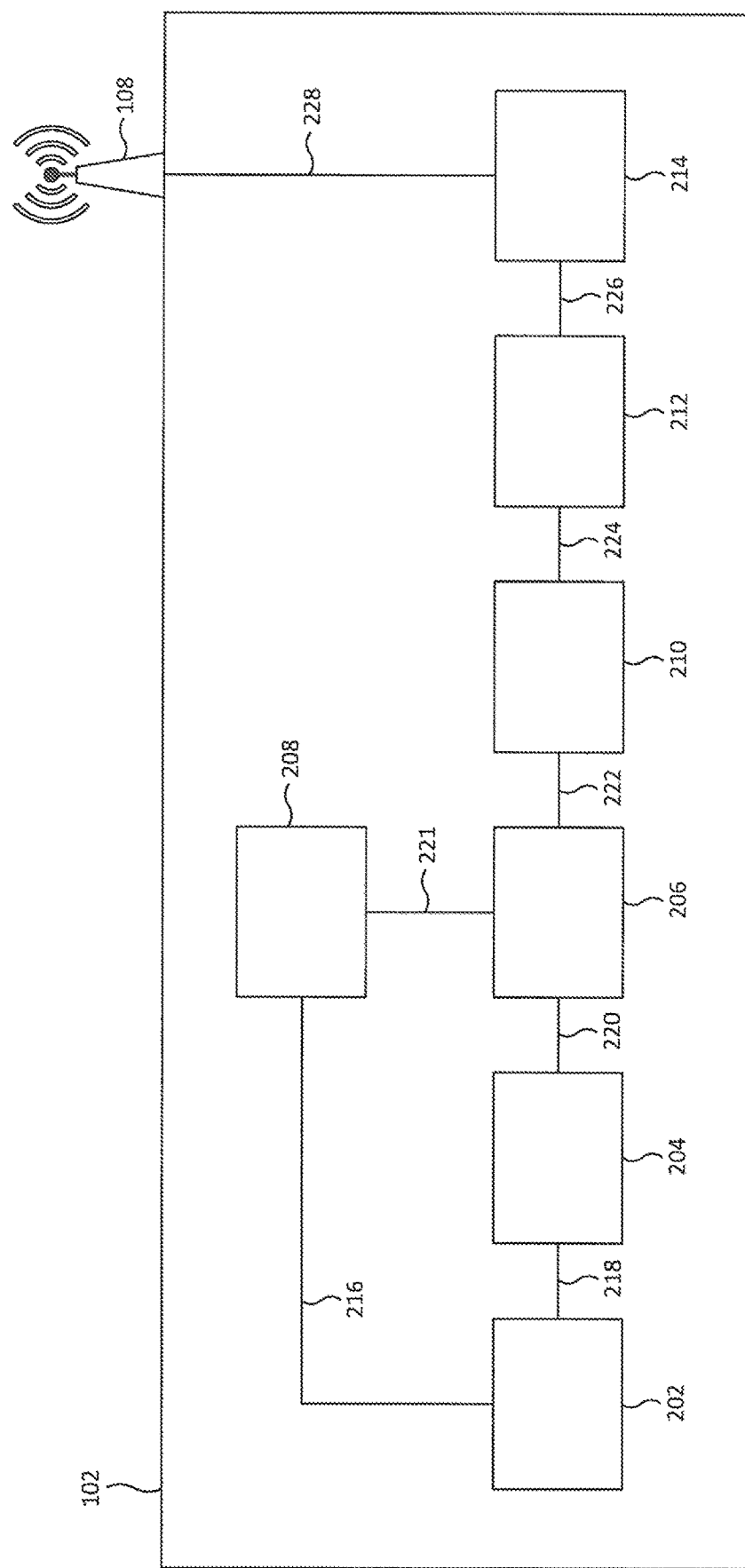
FIG. 2 shows a schematic drawing of the Wi-Fi access point.

FIG. 2 shows a schematic drawing of the Wi-Fi access point 102. The Wi-Fi access point 102 may include an modulation circuit 202, a transformation circuit 204, a modification circuit 206, a control circuit 208, a filtering circuit 210, an interpolation circuit 212 and a digital-to-analog converter 214.

The modulation circuit 202 may be connected with the control circuit 208 via a first connection 216 and with the transformation circuit 204 via a second connection 218. The transformation circuit 204 may be connected with the modification circuit 206 via a third connection 220. The modification circuit 206 may be connected with the filtering circuit 210 via a via a fourth connection 222 and the control circuit 208 via a fifth connection 221. The filtering circuit 210 may be connected with the interpolation circuit 212 via a sixth connection 224. The interpolation circuit 212 may be connected with the digital-to-analog converter 214 via a seventh connection 226. The digital-to-analog converter 214 may be connected with the transceiver 108 via an eighth connection 228.

The modulation circuit 202 may be configured to modulate symbols of a first plurality of symbols included in the signal in a frequency domain. Further, the modulation circuit 202 may be configured to determine a description information signal of each symbol, to transmit the description information signal to the control circuit 208 and to transmit the modulated signal to the transformation circuit 204.

The transformation circuit 204 may be configured to determine an output signal in accordance with an inverse Fast Fourier Transformation of the modulated signal and to transmit the output signal to the modification circuit 206.

Further, the control circuit 208 may be configured to determine modification information signals of the symbols of the first plurality of symbols, respectively. The control circuit 208 may be configured to determine the modification information signals based on the description information signals of the symbols, respectively, and to transmit the modification information signals to the modification circuit 206.

The modification circuit 206 may be configured to determine a modified signal by modifying the output signal of the transformation circuit 204 in consideration of the modification information signals and to transmit the modified signal to the filtering circuit 210.

The filtering circuit 210 may be configured to determine an output signal by filtering the output signal of the modification circuit 206 in accordance with a Finite Impulse Response (FIR) filter. Further, the filtering circuit 210 may be configured to transmit the output signal to the interpolation circuit 212. The interpolation circuit 212 may be configured to determine an output signal that includes interpolated samples of missing or distorted samples of the output signal of the filtering circuit. Further, the interpolation circuit 212 may be configured to transmit the output signal to the digital-to-analog converter 214. In a variation, the Wi-Fi access point 102 may further include a second interpolation circuit instead of the third connection 220. The second interpolation circuit may be connected with the transformation circuit 204 and the modification circuit 206. Further, the second interpolation circuit may increase an oversampling ratio to avoid an aliasing of an out-of-band distortion and to avoid an increase of the peak-to-average ratio of the in-band.

The digital-to-analog converter 214 may be configured to determine an analog output signal corresponding to the digital output signal of the interpolation circuit 212 and to transmit the output signal to the transceiver 108. The transceiver 108 may be configured to transmit the output signal of the digital-to-analog converter 214 via the radio frequency connection 106 to the wireless device 104.

Figure 3:
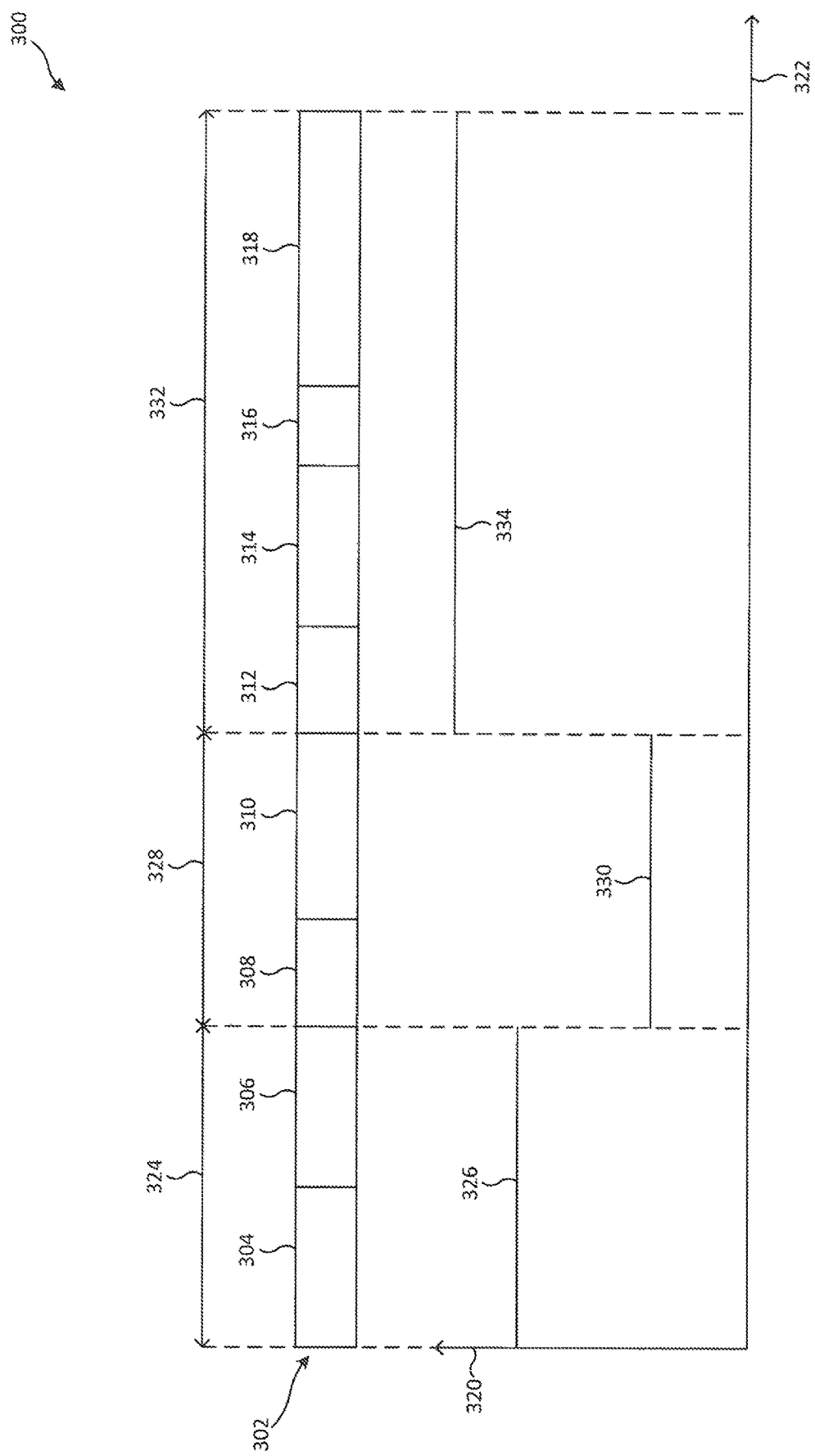
FIG. 3 is a schematic diagram that shows peak-to-average power ratios of a Physical Protocol Data Unit signal included in the signal.

FIG. 3 is a schematic diagram 300 that shows peak-to-average power ratios of a Physical Protocol Data Unit (PPDU) signal included in the signal. The diagram 300 has a first axis 320 that indicates a peak-to-average power ratio and a second axis 322 that indicates a modification time corresponding to a modification of a signal component of the PPDU signal that the modification circuit 206 is configured to modify at the indicated modification time.

The PPDU signal may include a Legacy Short Training field 304 (L-STF), a Legacy Long Training field 306 (L-LTF), a Legacy Signal field 308 (L-SIG), a Very High Throughput Signal-A field 310 (VHT-SIG-A), a Very High Throughput Short Training field 312 (VHT-STF), a Very High Throughput Long Training field 314 (VHT-LTF), a Very High Throughput Signal-B field 316 (VHT-SIG-B) and a Very High Throughput Data field 318 (VHT-Data). Moreover, each field of the fields 304 to 318 may include at least one symbol.

Further, the modulation circuit 202 may be configured to modulate the L-STF field 304 and the L-LTF field 306 in accordance with a first modulation scheme that includes phase rotations of each 20 MHZ (Megahertz) subchannel of a channel bandwidth, the L-SIG field 308 in accordance with a second modulation scheme that includes a Binary Phase Shift Keying (BPSK) modulation scheme and phase rotations of each 20 MHZ (Megahertz) subchannel of a channel bandwidth, the VHT-SIG-A field 310 in accordance with third modulation schemes that include a modulation of a first symbol of the VHT-SIG-A field 310 in accordance with a Binary Phase Shift Keying (BPSK) modulation scheme, a modulation of a second symbol of the VHT-SIG-A field 310 in accordance with a Quadrature Phase Shift Keying (QPSK) modulation scheme and phase rotations of each 20 MHZ (Megahertz) subchannel of a channel bandwidth, the VHT-STF field 312, the VHT-LTF field 314 and the VHT-SIG-B field 316 in accordance with a fourth modulation scheme that includes phase rotations of each 20 MHZ subchannel of the channel bandwidth and the VHT-Data field 318 in accordance with a fifth modulation scheme of a group of modulation schemes consisting of BPSK, QPSK, Sixteen Quadrature Amplitude Modulation (16-QAM), Sixty Four Quadrature Amplitude Modulation (64-QAM), Two Hundred Fifty Six Quadrature Amplitude Modulation (256-QAM) and One Thousand Twenty Four Quadrature Amplitude Modulation (1024-QAM).

Moreover, the modulation circuit 206 may be configured to modulate the symbols of the fields 304 and 306 in accordance with a first data rate, the symbols of the fields 308 and 310 in accordance with second data rates, the symbols of the fields 312, 314 and 316 in accordance with a third data rate and the symbols of the VHT-Data field 318 in accordance with a fourth data rate.

Moreover, the modulation circuit 202 may be configured to determine a plurality of description tags associated with the symbols of fields 304 to 318. Each description tag of the plurality of description tags may include an information about the symbol that the description tag is associated with. Further, the modulation circuit 202 may be configured to transmit the description tags of the plurality of description tags to the control circuit 208.

The control circuit 208 may be configured to select three threshold peak-to-average power ratios of a plurality of predefined threshold peak-to-average power ratios from which a first threshold peak-to-average power ratio is referenced by 326, a second threshold peak-to-average power ratio is referenced by 330 and a third threshold peak-to-average power ratio is referenced by 334, based on the description tags of the plurality of description tags. Further, the control circuit 208 may be configured to select the threshold peak-to-average power ratios 326, 330 and 334 such that the first threshold peak-to-average power ratio 326 is greater than the second threshold peak-to-average power ratio 330 and the third threshold peak-to-average power ratio 334 is greater than the first threshold peak-to-average power ratio 326.

Moreover, the control circuit 208 may be configured to determine a first modification information signal that includes a first information related to the first threshold peak-to-average power ratio 326, a second information signal that includes a second information related to the second threshold peak-to-average power ratio 330 and a third information signal that includes a third information related to the third threshold peak-to-average power ratio 334 and to transmit the threshold peak-to-average power ratios 326, 330 and 334 to the modification circuit 206.

The modification circuit 206 may be configured to determine a first clipped signal by clipping a first section 324 of the PPDU signal 302 at the first peak-to-average power ratio 326 indicated by the first peak-to-average power ratio information. The first section may include the L-STF field 304 and the L-LTF field 306. Moreover, the modification circuit 206 may be configured to determine the first clipped signal at each first modification time that corresponds to the modification of signal components included in the first section 324 such that the peak-to-average power ratio of the first clipped signal at the each first modification time is the minimum of the peak-to-average power ratio of the PPDU signal 302 at the each first modification time and the first peak-to-average power ratio 326.

Further, the modification circuit 206 may be configured to determine a second clipped signal by clipping a second section 328 of the PPDU signal 302 at a second peak-to-average power ratio 330 indicated by the second peak-to-average power ratio information. The second section 328 may include the L-SIG field 308 and the VHT-SIG-A field 310. Moreover, the modification circuit 206 may be configured to determine the second clipped signal at each second modification time that corresponds to the modification of signal components included in the second section 328 such that the peak-to-average power ratio of the second clipped signal at the each second modification time is the minimum of the peak-to-average power ratio of the PPDU signal 302 at the each second modification time and the second peak-to-average power ratio 330.

Moreover, the modification circuit 206 may be configured to receive a third modification information signal of the modification information signals that may include a third peak-to-average power ratio information. Further, the modification circuit 206 may be configured to determine a third clipped signal by clipping a third section 332 of the PPDU signal 302 at a third peak-to-average power ratio 330 indicated by the third peak-to-average power ratio information. The third section 332 may include the VHT-STF field 312, the VHT-LTF field 314, the VHT-SIG-B field 316 and the VHT-Data field 318. Moreover, the modification circuit 206 may be configured to determine the third clipped signal at each third modification time that corresponds to the modification of signal components included in the third section 332 such that the peak-to-average power ratio of the third clipped signal at the each third modification time is the minimum of the peak-to-average power ratio of the PPDU signal 302 at the each third modification time and the third peak-to-average power ratio 334.

Figure 4:
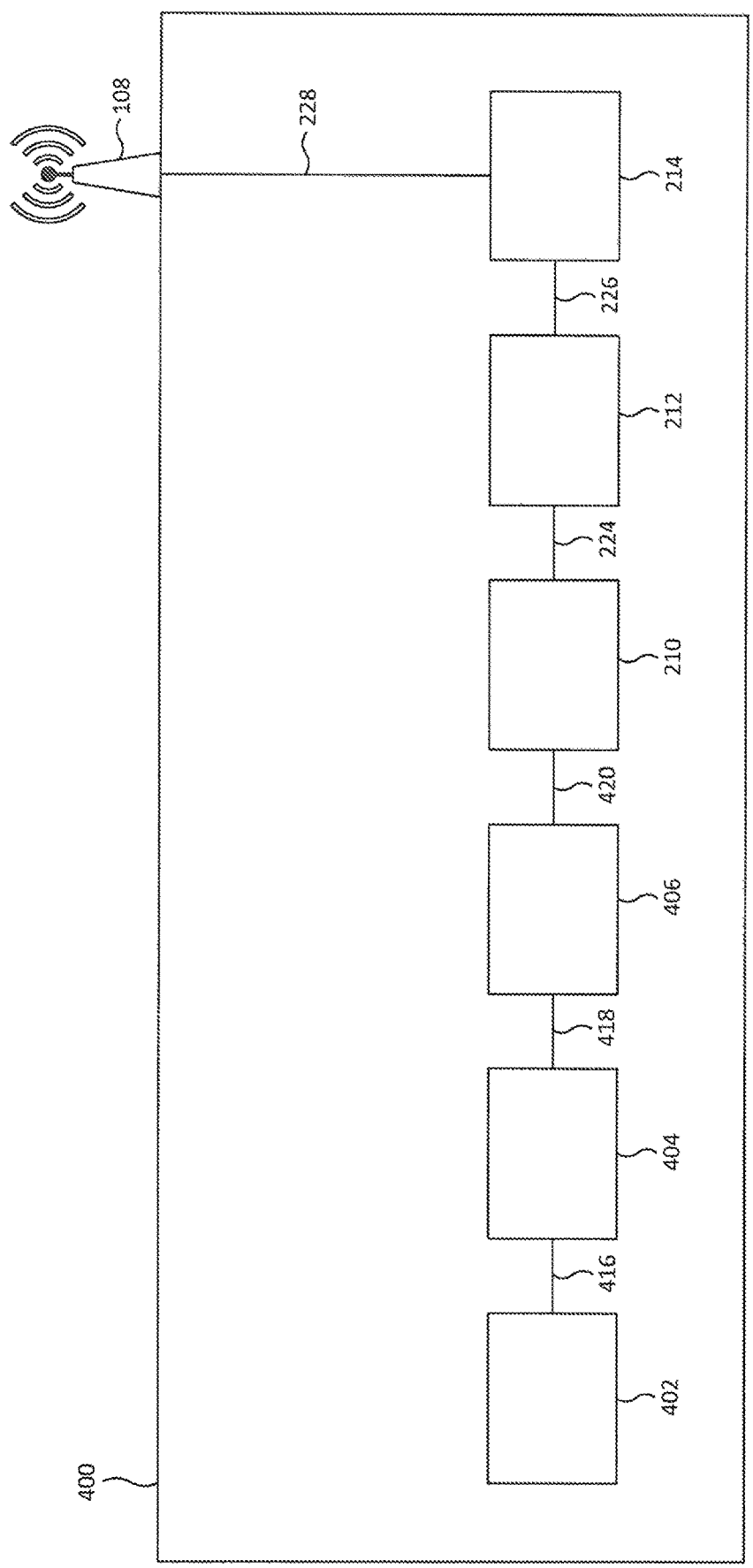
FIG. 4 shows a schematic drawing of a Wi-Fi modem 400 according to an example that may be configured to transmit the signal.

FIG. 4 shows a schematic drawing of a Wi-Fi modem 400 according to an example that may be configured to transmit the signal. The Wi-Fi modem 400 may include a modulation circuit 402, a transformation circuit 404, a modification circuit 406, the filtering circuit 210, the interpolation circuit 212, a digital-to-analog converter 214 and the transceiver 108. Features of the Wi-Fi modem 400 according to the example of FIG. 4 that correspond to features of the Wi-Fi access point 102 according to the example of FIG. 1, FIG. 2 and FIG. 3 may be indicated by the same reference numerals.

The modulation circuit 402 may be connected with the transformation circuit 404 via a ninth connection 416. The transformation circuit 404 may be connected with the modification circuit 406 via a tenth connection 418. The modification circuit 406 may be connected with the filtering circuit 210 via an eleventh connection 420.

The modulation circuit 402 may be configured to modulate symbols of a second plurality of symbols included in the signal in a frequency domain.

The transformation circuit 404 may be configured to determine an output signal in accordance with an inverse Fast Fourier Transformation of the modulated signal and to transmit the output signal to the modification circuit 406.

The modification circuit 406 may be configured to determine a modified signal by modifying the symbols included in the output signal of the transformation circuit 404 based on a modulation scheme of the symbols, a data rate of the symbols and a data type of the symbols and to transmit the modified signal to the filtering circuit 408.

Figure 5:
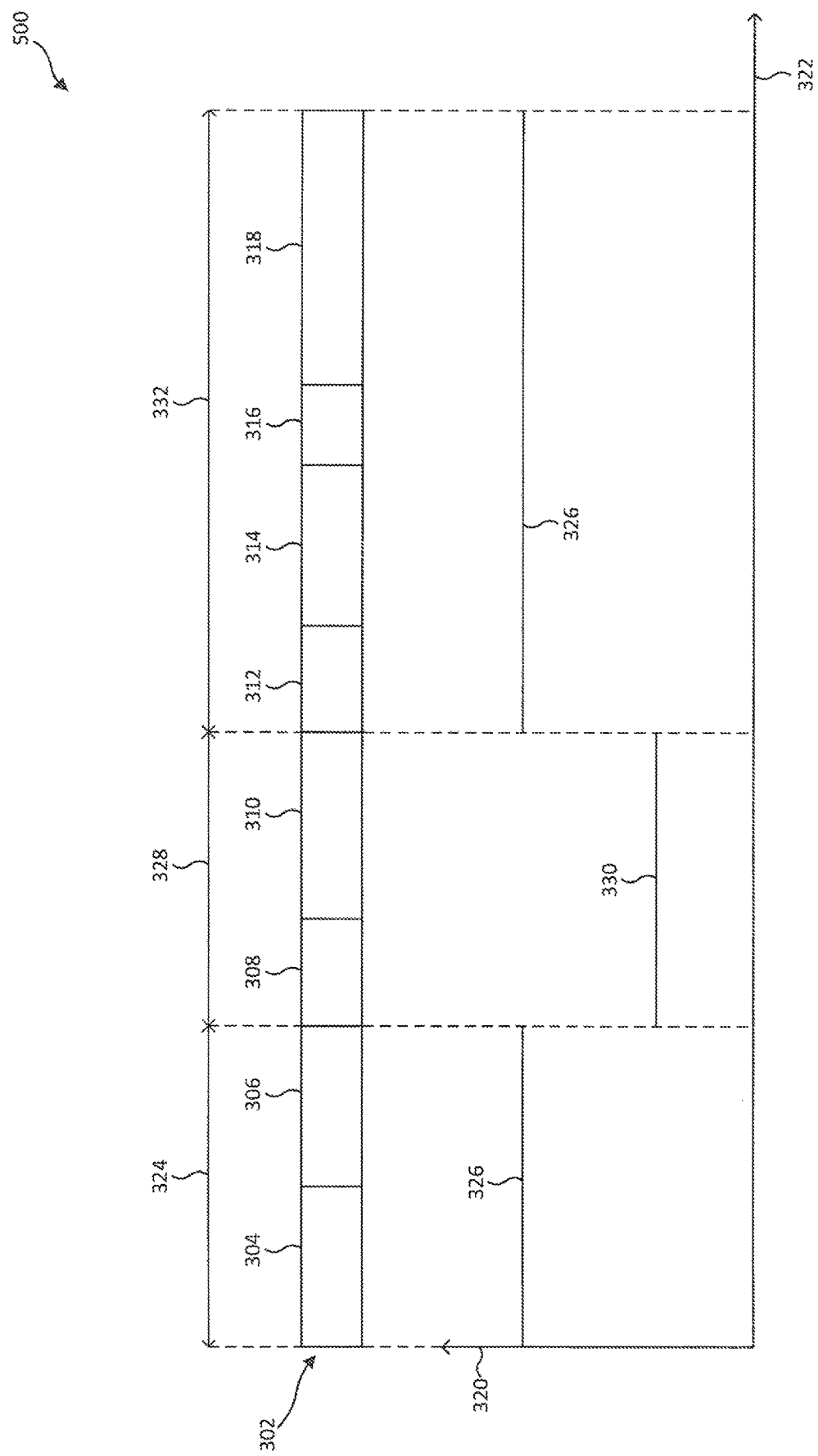
FIG. 5 is a schematic diagram that shows peak-to-average power ratios of the Physical Protocol Data Unit signal that is included in the signal.

FIG. 5 is a schematic diagram 500 that shows peak-to-average power ratios of the Physical Protocol Data Unit (PPDU) signal that is included in the signal.

The modification circuit 406 may be configured to determine a first threshold peak-to-average power ratio 326 and a second threshold peak-to-average power ratio 330 based on the first data rate, the second data rates, the third data rate and the fourth data rate. Further, the modification circuit 406 may be configured to determine the first threshold peak-to-average power ratio 326 to be greater than the second threshold peak-to-average power ratio 330 and to clip the peak-to-average power ratio of the symbols included in the first section 324 at the first threshold peak-to-average power ratio 326, the peak-to-average power ratio of the symbols included in the second section 328 at the second threshold peak-to-average power ratio 330 and the peak-to-average power ratio of the symbols included in the third section 332 at the first threshold peak-to-average power ratio 326.

All other aspects of the Wi-Fi modem 400 of FIGS. 4 to 5 may correspond to aspects of the Wi-Fi access point 102 of FIGS. 1 to 3.

Figure 6:
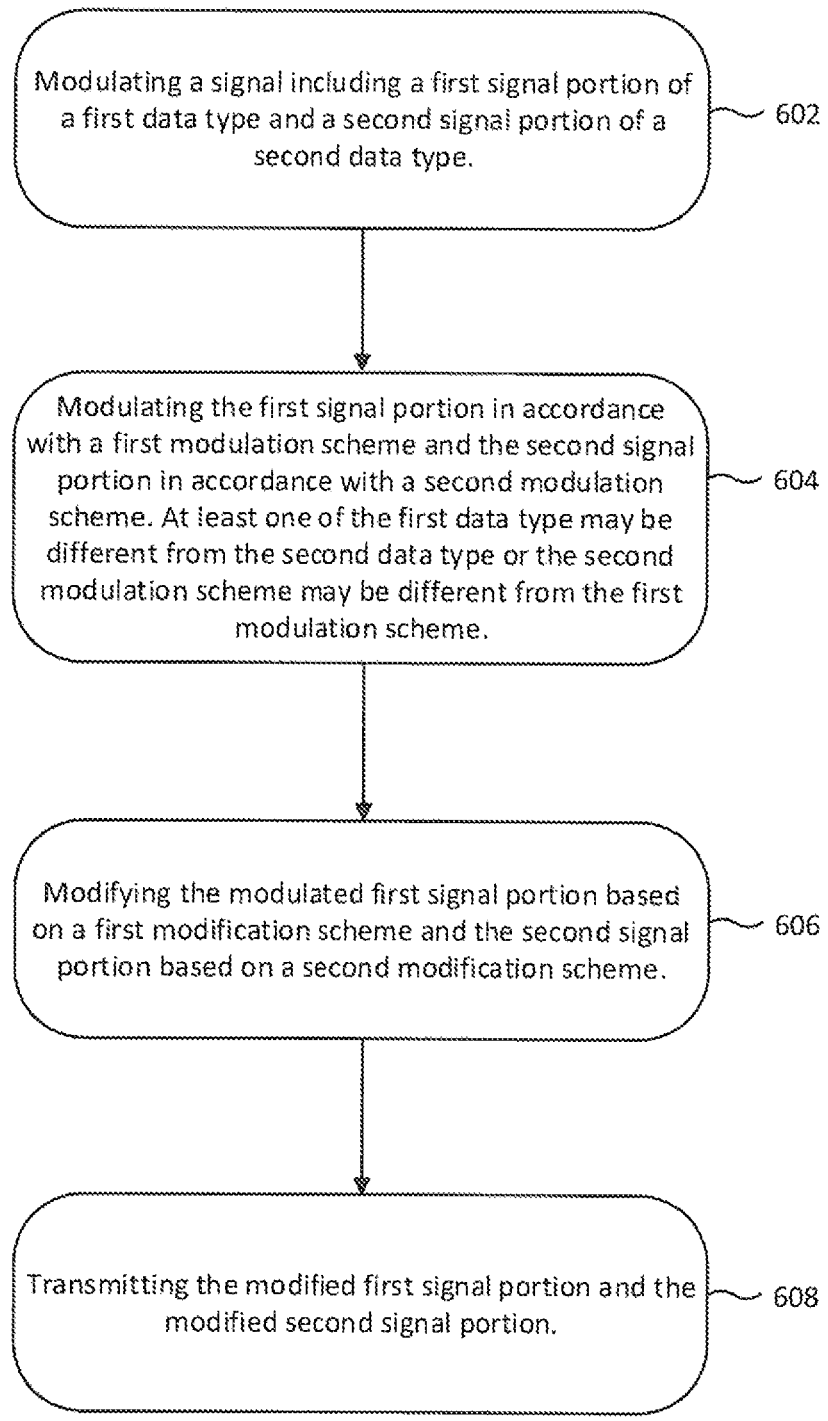
FIG. 6 shows a first method for performing radio communication.

FIG. 6 shows a first method for performing radio communication that may include, in 602, modulating a signal including a first signal portion of a first data type and a second signal portion of a second data type.

The first method may further include, in 604, modulating the first signal portion in accordance with a first modulation scheme and the second signal portion in accordance with a second modulation scheme. At least one of the first data type may be different from the second data type or the second modulation scheme may be different from the first modulation scheme.

The first method may further include, in 606, modifying the modulated first signal portion based on a first modification scheme and the second signal portion based on a second modification scheme.

The first method may further include, in 608, transmitting the modified first signal portion and the modified second signal portion.

FIG. 7 shows a second method for performing radio communication that may include, in 702, modulating a signal including signal portions of a plurality of signal portions. Each signal portion of the plurality of signal portions may have a data type of a plurality of data types and may be modulated in accordance with a modulation scheme of a plurality of modulation schemes. At least one of a first data type of a first signal portion of each pair of signal portions of the plurality of signal portions may be different from a second data type of a second signal portion of the each pair of signal portions or a first modulation scheme of the first signal portion of the each pair of signal portions may be different from a second modulation scheme of the second signal portion of the each pair of signal portions.

The second method may further include, in 704, modifying the modulated signal portions of the plurality of signal portions based on modification schemes of a plurality of predefined modification schemes, respectively.

The second method may further include, in 706, transmitting the modified signal portions of the plurality of signal portions.

In the following, various aspects of this disclosure will be illustrated:

Example 1 is a communication device that may include a modulation circuit configured to modulate a signal including a first signal portion of a first data type and a second signal portion of a second data type, wherein the modulation circuit may be configured to modulate the first signal portion in accordance with a first modulation scheme and the second signal portion in accordance with a second modulation scheme. At least one of the first data type may be different from the second data type or the second modulation scheme may be different from the first modulation scheme. The communication device may further include a modification circuit configured to modify the modulated first signal portion based on a first modification scheme and the second signal portion based on a second modification scheme and a transmitter configured to transmit the modified first signal portion and the modified second signal portion.

In Example 2, the subject matter of Example 1 can optionally include that the modification circuit may be configured to modify the modulated first signal portion such that the peak-to-average power ratio of the modified first signal portion may be smaller or equal than a first threshold peak-to-average power ratio. The modification circuit may be configured to modify the modulated second signal portion such that the peak-to-average power ratio of the modified second signal portion may be smaller or equal than a second threshold peak-to-average power ratio that may be different from the first threshold peak-to-average power ratio.

In Example 3, the subject matter of Example 2 can optionally include that the modification circuit may be configured to determine a first clipped signal by clipping the modulated first signal portion at the first threshold peak-to-average power ratio. The modification circuit may be configured to determine a second clipped signal by clipping the modulated second signal portion at the second threshold peak-to-average power ratio. The modification circuit may be configured to determine the a modified signal that may include the first clipped signal and the second clipped signal.

In Example 4, the subject matter Example 3 can optionally include that the modified signal may include the first clipped signal in a first time portion of the modified signal and the second clipped signal in a second time portion of the modified signal and the transmitter may be configured to transmit the modified signal.

In Example 5, the subject matter of any one of Examples 2 to 4 can optionally include that the modification circuit may be configured to determine the first threshold peak-to-average power ratio based on at least one of the first modulation scheme, a data rate of the first signal portion or a data type of the first signal portion. The modification circuit may be configured to determine the second threshold peak-to-average power ratio based on at least one of the second modulation scheme, a data rate of the second signal portion or a data type of the second signal portion.

In Example 6, the subject matter of Example 5 can optionally include that the data type may be a data type of a group of data types consisting of preamble, header and message content data.

In Example 7, the subject matter of any one of Examples 1 to 6 can optionally include that the first modulation scheme and the second modulation scheme may be modulation schemes of a group of modulation schemes consisting of Binary Phase-Shift Keying, Quadrature Phase-Shift Keying, Sixteen Quadrature Amplitude Modulation, Sixty Four Quadrature Amplitude Modulation, Two Hundred Fifty Six Quadrature Amplitude Modulation and One Thousand Twenty Four Quadrature Amplitude Modulation.

In Example 8, the subject matter of any one of Examples 1 to 7 can optionally include that the first modulation scheme and the second modulation scheme may be coded in accordance with a code rate of one of a group of code rates consisting of one half, two thirds, three quarters, five sixths, and seven eighths.

In Example 9, the subject matter of any one of Examples 1 to 8 can optionally include that the communication device may further include a control circuit configured to receive a first information signal that may include a first information based on the first signal portion and a second information signal that may include a second information based on the second signal portion. The control circuit may be configured to select a predefined first value of a plurality of predefined values based on the first information and a predefined second value of a plurality of predefined values based on the second information. The modification circuit may be configured to determine the first threshold peak-to-average power ratio to be the first value and the second threshold peak-to-average power ratio to be the second value.

In Example 10, the subject matter of Example 9 can optionally include that the first information may include at least one of a first modulation scheme information of the first modulation scheme, a first data rate information of the data rate of the first signal portion or a first data type information of the data type of the first signal portion. The second information may include at least one of a second modulation scheme information of the second modulation scheme, a second data rate information of the data rate of the second signal portion or a second data type information of the data type of the second signal portion.

In Example 11, the subject matter of Example 10 can optionally include that the control circuit may be configured to select the first threshold peak-to-average power ratio based on at least one of the first modulation scheme information, the first data rate information or the first data type information. The control circuit may be configured to select the second threshold peak-to-average power ratio based on at least one of the second modulation scheme information, the second data rate information or the second data type information.

In Example 12, the subject matter of any one of Examples 1 to 11 can optionally include that the first signal portion may include a first data packet and the second signal portion may include a second data packet. The data type of the first signal portion may be the data type of the first data packet and the data type of the second signal portion may be the data type of the second data packet.

Example 13 is a communication device. The communication device may include a modulation circuit configured to modulate a signal including signal portions of a plurality of signal portions, each signal portion of the plurality of signal portions having a data type of a plurality of data types and being modulated in accordance with a modulation scheme of a plurality of modulation schemes. At least one of a first data type of a first signal portion of each pair of signal portions of the plurality of signal portions may be different from a second data type of a second signal portion of the each pair of signal portions or a first modulation scheme of the first signal portion of the each pair of signal portions may be different from a second modulation scheme of the second signal portion of the each pair of signal portions. The communication device may further include a modification circuit configured to modify the modulated signal portions of the plurality of signal portions based on modification schemes of a plurality of predefined modification schemes, respectively. The communication device may further include a transmitter configured to transmit the modified signal portions of the plurality of signal portions.

In Example 14, the subject matter of Example 13 can optionally include that the modification circuit may be configured to modify the modulated signal portions of the plurality of signal portions such that the peak-to-average power ratios of the modified signal portions of the plurality of signal portions may be smaller or equal than threshold peak-to-average power ratios of a plurality of threshold peak-to-average power ratios, respectively.

In Example 15, the subject matter of Examples 14 can optionally include that the modification circuit may be configured to determine a plurality of clipped signals by clipping the modulated signal portions of the plurality of signal portions at the threshold peak-to-average power ratios of the plurality of threshold peak-to-average power ratios, respectively. The modification circuit may be configured to determine a modified signal that may include the plurality of clipped signals.

In Example 16, the subject matter of Example 15 can optionally include that the modified signal may include a plurality of time portions that include the clipped signals of the plurality of clipped signals, respectively. The transmitter may be configured to transmit the modified signal.

In Example 17, the subject matter of any one of Examples 14 to 16 can optionally include that the modification circuit may be configured to determine the threshold peak-to-average power ratios of the plurality of threshold peak-to-average power ratios based on at least one of the modulation schemes of the plurality of modulation schemes, data rates of the signal portions of the plurality of signal portions or the data types of the signal portions of the plurality of signal portions.

In Example 18, the subject matter of Example 17 can optionally include that the data type of each signal portion of the plurality of signal portions may be a data type of a group of data types consisting of preamble, header and message content data.

In Example 19, the subject matter of any one of Examples 13 to 18 can optionally include that each modulation scheme of the plurality of modulation schemes may be a modulation scheme of a group of modulation schemes consisting of Binary Phase-Shift Keying, Quadrature Phase-Shift Keying, Sixteen Quadrature Amplitude Modulation, Sixty Four Quadrature Amplitude Modulation, Two Hundred Fifty Six Quadrature Amplitude Modulation and One Thousand Twenty Four Quadrature Amplitude Modulation.

In Example 20, the subject matter of any one of Examples 13 to 19 can optionally include that each modulation scheme of the plurality of modulation schemes may be coded in accordance with a code rate of one of a group of code rates consisting of one half, two thirds, three quarters, five sixths and seven eighths.

In Example 21, the subject matter of Example 20 can optionally include that the communication device may further include a control circuit configured to receive a plurality of information signals associated with the signal portions, respectively. Each information signal of the plurality of information signals may include an information data based on the signal portion that the each information signal may be associated with. The control circuit may be configured to select predefined values of a plurality of predefined values based on the information data of the information signals of the plurality of information signals. The modification circuit may be configured to determine the threshold peak-to-average power ratios of the plurality of threshold peak-to-average power ratios to be the selected predefined values, respectively.

In Example 22, the subject matter of Example 21 can optionally include that the information data of each information signal may include at least one of a modulation scheme information of the signal portion that the information signal may be associated with, a data rate information of the signal portion that the information signal may be associated with or a data type information of the signal portion that the information signal may be associated with.

In Example 23, the subject matter of Example 22 can optionally include that the control circuit may be configured to select each predefined value of the plurality of predefined values based on at least one of the modulation scheme information of the signal portion that the information signal may be associated with, the data rate information of the signal portion that the information signal may be associated with or the data type information of the first signal portion that the information signal may be associated with.

In Example 24, the subject matter of any one of Examples 13 to 23 can optionally include that the signal portions of the plurality of signal portions include data packets of a plurality of data packets, respectively. The data types of the signal portions of the plurality of signal portions may be data types of the data packets of the plurality of data packets, respectively.

In Example 25, the subject matter of any one of Examples 1 to 24 can optionally include that the transmitter may include a finite-impulse-response filter configured to filter the modified signal portions.

In Example 26, the subject matter of Example 25 can optionally include that the transmitter may include a digital-to-analog-converter configured to determine analog signal portions based on the filtered signal portions, respectively.

In Example 27, the subject matter of Example 26 can optionally include that the transmitter may include a power amplifier configured to amplify the power of the converted signal portions.

In Example 28, the subject matter of any one of Examples 1 to 27 can optionally include that the modulation circuit may include a transformation circuit configured to transform the signal based on an inverse fast Fourier transformation.

In Example 29, the subject matter of any one of Examples 1 to 28 can optionally include that the communication device may be configured in accordance with a communication standard of a group of communication standards consisting of WiFi, Universal Mobile Telecommunications System, Enhanced Data Rates for Global Evolution, Code Division Multiple Access 200, Long Term Evolution, Long Term Evolution Advanced and Blue Tooth.

Example 30 is a method for performing radio communication. The method may include modulating a signal including a first signal portion of a first data type and a second signal portion of a second data type. The first signal portion may be modulated in accordance with a first modulation scheme and the second signal portion may be modulated in accordance with a second modulation scheme and at least one of the first data type may be different from the second data type or the second modulation scheme may be different from the first modulation scheme. The method may further include modifying the modulated first signal portion based on a first modification scheme and the second signal portion based on a second modification scheme and transmitting the modified first signal portion and the modified second signal portion.

In Example 31, the subject matter of Example 30 can optionally include that the modulated first signal portion may be modulated such that the peak-to-average power ratio of the modified first signal portion may be smaller or equal than a first threshold peak-to-average power ratio. The modulated second signal portion may be modulated such that the peak-to-average power ratio of the modified second signal portion may be smaller or equal than a second threshold peak-to-average power ratio that may be different from the first threshold peak-to-average power ratio.

In Example 32, the subject matter of Example 31 can optionally include that the method may further include determining a first clipped signal by clipping the modulated first signal portion at the first threshold peak-to-average power ratio, determining a second clipped signal by clipping the modulated second signal portion at the second threshold peak-to-average power ratio and determining a modified signal that may include the first clipped signal and the second clipped signal.

In Example 33, the subject matter of Example 32 can optionally include that the modified signal may include the first clipped signal in a first time portion of the modified signal and the second clipped signal in a second time portion of the modified signal. The method may further include transmitting the modified signal.

In Example 34, the subject matter of any one of Examples 31 to 33 can optionally include that the method may further include determining the first threshold peak-to-average power ratio based on at least one of the first modulation scheme, a data rate of the first signal portion or a data type of the first signal portion and determining the second threshold peak-to-average power ratio based on at least one of the second modulation scheme, a data rate of the second signal portion or a data type of the second signal portion.

In Example 35, the subject matter of Example 34 can optionally include that the data type may be a data type of a group of data types consisting of preamble, header and message content data.

In Example 36, the subject matter of any one of Examples 30 to 35 can optionally include that the first modulation scheme and the second modulation scheme may be modulation schemes of a group of modulation schemes consisting of Binary Phase-Shift Keying, Quadrature Phase-Shift Keying, Sixteen-Quadrature Amplitude Modulation, Sixty Four Quadrature Amplitude Modulation, Two Hundred Fifty Six Quadrature Amplitude Modulation and One Thousand Twenty Four Quadrature Amplitude Modulation.

In Example 37, the subject matter of any one of Examples 30 to 36 can optionally include that the first modulation scheme and the second modulation scheme may be coded in accordance with a code rate of one of a group of code rates consisting of one half, two thirds, three quarters, five sixths and seven eighths.

In Example 38, the subject matter of any one of Examples 32 to 37 can optionally include that the method may further include receiving a first information signal that may include a first information based on the first signal portion and a second information signal that may include a second information based on the second signal portion, selecting a predefined first value of a plurality of predefined values based on the first information and a predefined second value of a plurality of predefined values based on the second information and determining the first threshold peak-to-average power ratio to be the first value and the second threshold peak-to-average power ratio to be the second value.

In Example 39, the subject matter of Example 38 can optionally include that the first information may include at least one of a first modulation scheme information of the first modulation scheme, a first data rate information of the data rate of the first signal portion or a first data type information of the data type of the first signal portion. The second information may include at least one of a second modulation scheme information of the second modulation scheme, a second data rate information of the data rate of the second signal portion or a second data type information of the data type of the second signal portion.

In Example 40, the subject matter of Example 39 can optionally include that the first threshold peak-to-average power ratio may be selected based on at least one of the first modulation scheme information, the first data rate information or the first data type information. The second threshold peak-to-average power ratio may be selected based on at least one of the second modulation scheme information, the second data rate information or the second data type information.

In Example 41, the subject matter of any one of Examples 30 to 40 can optionally include that the first signal portion may include a first data packet and the second signal portion may include a second data packet. The data type of the first signal portion may be the data type of the first data packet and the data type of the second signal portion may be the data type of the second data packet.

Example 42 is a method for performing radio communication. The method may include modulating a signal including signal portions of a plurality of signal portions, each signal portion of the plurality of signal portions having a data type of a plurality of data types and being modulated in accordance with a modulation scheme of a plurality of modulation schemes. At least one of a first data type of a first signal portion of each pair of signal portions of the plurality of signal portions may be different from a second data type of a second signal portion of the each pair of signal portions or a first modulation scheme of the first signal portion of the each pair of signal portions may be different from a second modulation scheme of the second signal portion of the each pair of signal portions. The method may further include modifying the modulated signal portions of the plurality of signal portions based on modification schemes of a plurality of predefined modification schemes, respectively, and transmitting the modified signal portions of the plurality of signal portions.

In Example 43, the subject matter of Example 42 can optionally include that the modulated signal portions of the plurality of signal portions may be modified such that the peak-to-average power ratios of the modified signal portions of the plurality of signal portions may be smaller or equal than threshold peak-to-average power ratios of a plurality of threshold peak-to-average power ratios, respectively.

In Example 44, the subject matter of Example 43 can optionally include that the method may further include determining a plurality of clipped signals by clipping the modulated signal portions of the plurality of signal portions at the threshold peak-to-average power ratios of the plurality of threshold peak-to-average power ratios, respectively, and determining a modified signal that may include the plurality of clipped signals.

In Example 45, the subject matter of Example 44 can optionally include that the modified signal may include a plurality of time portions that include the clipped signals of the plurality of clipped signals, respectively. The method further may include transmitting the modified signal.

In Example 46, the subject matter of any one of Examples 43 to 45 can optionally include that the method may further include determining the threshold peak-to-average power ratios of the plurality of threshold peak-to-average power ratios based on at least one of the modulation schemes of the plurality of modulation schemes, data rates of the signal portions of the plurality of signal portions or the data types of the signal portions of the plurality of signal portions.

In Example 47, the subject matter of Example 46 can optionally include that the data type of each signal portion of the plurality of signal portions may be a data type of a group of data types consisting of preamble, header and message content data.

In Example 48, the subject matter of any one of Examples 42 to 47 can optionally include that each modulation scheme of the plurality of modulation schemes may be a modulation scheme of a group of modulation schemes consisting of Binary Phase-Shift Keying, Quadrature Phase-Shift Keying, Sixteen Quadrature Amplitude Modulation, Sixty Four Quadrature Amplitude Modulation, Two Hundred Fifty Six Quadrature Amplitude Modulation and One Thousand Twenty Four Quadrature Amplitude Modulation.

In Example 49, the subject matter of any one of Examples 42 to 48 can optionally include that each modulation scheme of the plurality of modulation schemes may be coded in accordance with a code rate of one of a group of code rates consisting of one half, two thirds, three quarters, five sixths and seven eighths.

In Example 50, the subject matter of Example 49 can optionally include that the method may further include receiving a plurality of information signals associated with the signal portions, respectively. Each information signal of the plurality of information signals may include an information data based on the signal portion that the each information signal may be associated with. The method may further include selecting predefined values of a plurality of predefined values based on the information data of the information signals of the plurality of information signals. The threshold peak-to-average power ratios of the plurality of threshold peak-to-average power ratios may be determined to be the selected predefined values, respectively.

In Example 51, the subject matter of Example 50 can optionally include that the information data of each information signal may include at least one of a modulation scheme information of the signal portion that the information signal may be associated with, a data rate information of the signal portion that the information signal may be associated with or a data type information of the signal portion that the information signal may be associated with.

In Example 52, the subject matter of Example 51 can optionally include that each predefined value of the plurality of predefined values may be selected based on at least one of the modulation scheme information of the signal portion that the information signal may be associated with, the data rate information of the signal portion that the information signal may be associated with or the data type information of the first signal portion that the information signal may be associated with.

In Example 53, the subject matter of any one of Examples 42 to 52 can optionally include that the signal portions of the plurality of signal portions include data packets of a plurality of data packets, respectively. The data types of the signal portions of the plurality of signal portions may be data types of the data packets of the plurality of data packets, respectively.

In Example 54, the subject matter of any one of Examples 42 to 53 can optionally include that the method may further include filtering the modified signal portions.

In Example 55, the subject matter of Example 54 can optionally include that the method may further include determining analog signal portions based on the filtered signal portions, respectively.

In Example 56, the subject matter of Example 55 can optionally include that the method may further include amplifying the power of the converted signal portions.

In Example 57, the subject matter of any one of Examples 42 to 56 can optionally include that the method may further include transforming the signal based on an inverse fast Fourier transformation.

In Example 58, the subject matter of any one of Examples 42 to 57 can optionally include that the signal may be a signal in accordance with a communication standard of a group of communication standards consisting of WiFi, Universal Mobile Telecommunications System, Enhanced Data Rates for Global Evolution, Code Division Multiple Access 200, Long Term Evolution, Long Term Evolution Advanced and Blue Tooth.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device, comprising:
   a modulation circuit configured to modulate a signal comprising a first signal portion of a first data type and a second signal portion of a second data type, wherein the modulation circuit is configured to modulate the first signal portion in accordance with a first modulation scheme and the second signal portion in accordance with a second modulation scheme, and
   wherein at least one of the first data type is different from the second data type or the second modulation scheme is different from the first modulation scheme;
   a modification circuit configured to modify the modulated first signal portion based on a first modification scheme and the second signal portion based on a second modification scheme, wherein the first modification scheme and the second modification scheme are different; and
   a transmitter configured to transmit the modified first signal portion and the modified second signal portion.

2. The communication device of claim 1,
   wherein the modification circuit is configured to modify the modulated first signal portion such that a peak-to-average power ratio of the modified first signal portion is smaller or equal than a first threshold peak-to-average power ratio; and
   wherein the modification circuit is configured to modify the modulated second signal portion such that a peak-to-average power ratio of the modified second signal portion is smaller or equal than a second threshold peak-to-average power ratio that is different from the first threshold peak-to-average power ratio.

3. The communication device of claim 2,
   wherein the modification circuit is configured to determine a first clipped signal by clipping the modulated first signal portion at the first threshold peak-to-average power ratio;
   wherein the modification circuit is configured to determine a second clipped signal by clipping the modulated second signal portion at the second threshold peak-to-average power ratio; and
   wherein the modification circuit is configured to determine a modified signal that comprises the first clipped signal and the second clipped signal.

4. The communication device of claim 3,
   wherein the modified signal comprises the first clipped signal in a first time portion of the modified signal and the second clipped signal in a second time portion of the modified signal; and
   wherein the transmitter is configured to transmit the modified signal.

5. The communication device of claim 4,
   wherein the modification circuit is configured to determine the first threshold peak-to-average power ratio based on at least one of the first modulation scheme, a data rate of the first signal portion or a data type of the first signal portion; and wherein the modification circuit is configured to determine the second threshold peak-to-average power ratio based on at least one of the second modulation scheme, a data rate of the second signal portion or a data type of the second signal portion.

6. The communication device of claim 5,
wherein the data type is a data type of a group of data types consisting of:
preamble;
header; and
message content data.

7. The communication device of claim 2, further comprising:
a control circuit configured to receive a first information signal that includes a first information based on the first signal portion and a second information signal that includes a second information based on the second signal portion;
wherein the control circuit is configured to select a predefined first value of a plurality of predefined values based on the first information and a predefined second value of a plurality of predefined values based on the second information; and
wherein the modification circuit is configured to determine the first threshold peak-to-average power ratio to be the first value and the second threshold peak-to-average power ratio to be the second value.

8. The communication device of claim 7,
wherein the first information comprises at least one of a first modulation scheme information of the first modulation scheme, a first data rate information of the data rate of the first signal portion or a first data type information of the data type of the first signal portion; and
wherein the second information comprises at least one of a second modulation scheme information of the second modulation scheme, a second data rate information of the data rate of the second signal portion or a second data type information of the data type of the second signal portion.

9. The communication device of claim 8,
wherein the control circuit is configured to select the first threshold peak-to-average power ratio based on at least one of the first modulation scheme information, the first data rate information or the first data type information; and
wherein the control circuit is configured to select the second threshold peak-to-average power ratio based on at least one of the second modulation scheme information, the second data rate information or the second data type information.

10. The communication device of claim 9,
wherein the first signal portion comprises a first data packet and the second signal portion comprises a second data packet;
wherein the data type of the first signal portion is the data type of the first data packet; and
wherein the data type of the second signal portion is the data type of the second data packet.

11. A communication device, comprising:
a modulation circuit configured to modulate a signal comprising signal portions of a plurality of signal portions, each signal portion of the plurality of signal portions having a data type of a plurality of data types and being modulated in accordance with a modulation scheme of a plurality of modulation schemes,
wherein at least one of a first data type of a first signal portion of each pair of signal portions of the plurality of signal portions is different from a second data type of a second signal portion of the each pair of signal portions or a first modulation scheme of the first signal portion of the each pair of signal portions is different from a second modulation scheme of the second signal portion of the each pair of signal portions;
a modification circuit configured to modify the modulated signal portions of the plurality of signal portions based on modification schemes of a plurality of predefined modification schemes, respectively; and
a transmitter configured to transmit the modified signal portions of the plurality of signal portions.

12. The communication device of claim 11,
wherein the modification circuit is configured to modify the modulated signal portions of the plurality of signal portions such that peak-to-average power ratios of the modified signal portions of the plurality of signal portions are smaller or equal than threshold peak-to-average power ratios of a plurality of threshold peak-to-average power ratios, respectively.

13. The communication device of claim 12,
wherein the modification circuit is configured to determine a plurality of clipped signals by clipping the modulated signal portions of the plurality of signal portions at the threshold peak-to-average power ratios of the plurality of threshold peak-to-average power ratios, respectively; and
wherein the modification circuit is configured to determine a modified signal that comprises the plurality of clipped signals.

14. The communication device of claim 13,
wherein the modification circuit is configured to determine the threshold peak-to-average power ratios of the plurality of threshold peak-to-average power ratios based on at least one of the modulation schemes of the plurality of modulation schemes, data rates of the signal portions of the plurality of signal portions or the data types of the signal portions of the plurality of signal portions.

15. The communication device of claim 1,
wherein the communication device is configured in accordance with a communication standard of a group of communication standards consisting of:
WiFi;
Universal Mobile Telecommunications System;
Enhanced Data Rates for Global Evolution;
Code Division Multiple Access 200;
Long Term Evolution;
Long Term Evolution Advanced; and
Blue Tooth.

16. A method for performing radio communication, comprising:
modulating a signal comprising a first signal portion of a first data type and a second signal portion of a second data type, wherein the first signal portion is modulated in accordance with a first modulation scheme and the second signal portion is modulated in accordance with a second modulation scheme, and
wherein at least one of the first data type is different from the second data type or the second modulation scheme is different from the first modulation scheme;
modifying the modulated first signal portion based on a first modification scheme and the second signal portion based on a second modification scheme, wherein the first modification scheme and the second modification scheme are different; and transmitting the modified first signal portion and the modified second signal portion.

17. The method of claim 16, wherein the modulated first signal portion is modulated such that a peak-to-average power ratio of the modified first signal portion is smaller or equal than a first threshold peak-to-average power ratio; and wherein the modulated second signal portion is modulated such that a peak-to-average power ratio of the modified second signal portion is smaller or equal than a second threshold peak-to-average power ratio that is different from the first threshold peak-to-average power ratio.

18. The method of claim 17, further comprising:

determining a first clipped signal by clipping the modulated first signal portion at the first threshold peak-to-average power ratio;

determining a second clipped signal by clipping the modulated second signal portion at the second threshold peak-to-average power ratio;

determining a modified signal that comprises the first clipped signal and the second clipped signal.

19. The method of claim 18, determining the first threshold peak-to-average power ratio based on at least one of the first modulation scheme, a data rate of the first signal portion or a data type of the first signal portion; and determining the second threshold peak-to-average power ratio based on at least one of the second modulation scheme, a data rate of the second signal portion or a data type of the second signal portion.

20. The method of claim 19, further comprising:

receiving a first information signal that includes a first information based on the first signal portion and a second information signal that includes a second information based on the second signal portion;

selecting a predefined first value of a plurality of predefined values based on the first information and a predefined second value of a plurality of predefined values based on the second information; and determining the first threshold peak-to-average power ratio to be the first value and the second threshold peak-to-average power ratio to be the second value.

21. The method of claim 20, wherein the first information comprises at least one of a first modulation scheme information of the first modulation scheme, a first data rate information of the data rate of the first signal portion or a first data type information of the data type of the first signal portion; and wherein the second information comprises at least one of a second modulation scheme information of the second modulation scheme, a second data rate information of the data rate of the second signal portion or a second data type information of the data type of the second signal portion.

22. The method of claim 21, wherein the first threshold peak-to-average power ratio is selected based on at least one of the first modulation scheme information, the first data rate information or the first data type information; and wherein the second threshold peak-to-average power ratio is selected based on at least one of the second modulation scheme information, the second data rate information or the second data type information.

23. A method for performing radio communication, comprising:

modulating a signal comprising signal portions of a plurality of signal portions, each signal portion of the plurality of signal portions having a data type of a plurality of data types and being modulated in accordance with a modulation scheme of a plurality of modulation schemes, wherein at least one of a first data type of a first signal portion of each pair of signal portions of the plurality of signal portions is different from a second data type of a second signal portion of the each pair of signal portions or a first modulation scheme of the first signal portion of the each pair of signal portions is different from a second modulation scheme of the second signal portion of the each pair of signal portions;

modifying the modulated signal portions of the plurality of signal portions based on modification schemes of a plurality of predefined modification schemes, respectively; and transmitting the modified signal portions of the plurality of signal portions.

24. The method of claim 23, wherein the modulated signal portions of the plurality of signal portions are modified such that peak-to-average power ratios of the modified signal portions of the plurality of signal portions are smaller or equal than threshold peak-to-average power ratios of a plurality of threshold peak-to-average power ratios, respectively.

25. The method of claim 24, further comprising:

determining a plurality of clipped signals by clipping the modulated signal portions of the plurality of signal portions at the threshold peak-to-average power ratios of the plurality of threshold peak-to-average power ratios, respectively;

determining a modified signal that comprises the plurality of clipped signals.

* * * * *